Patented Jan. 18, 1938

2,106,010

UNITED STATES PATENT OFFICE 2,106,010

PROCESS OF PURIFICATION AND REGENERATION OF USED LUBRICATING OILS

Mario Giacomo Levi, Alberto Mariotti, and Igino Ciarrocchi, Milan, Italy

No Drawing. Application February 23, 1935, Serial No. 7,882. In Italy April 23, 1934

10 Claims. (Cl. 196—16)

This invention relates to a process for the purification and regeneration of used lubricating oils.

One of the objects of our invention is the purification and regeneration of used lubricating oils which have heretofore been employed for lubricating internal combustion engines, and of oils which have been used for other purposes such as for transmissions, transformers, etc., by making use of the action of solid powdered aluminum chloride at the critical range of temperatures hereinafter specified and for a sufficient time period through polymerization, to cause the impurities of a tarry, asphaltic or like nature to coagulate and precipitate.

Another object of our invention is to prolong the period of the action of said powdered aluminum chloride on the oil after complete precipitation has taken place, for a time period sufficient by polymerization or resaturation to reconstruct the molecular structure of such part of the oil as has been attacked and partially destroyed or broken down during use.

Lubricating oils after a certain period of use for the purposes above specified, become dark colored, and acquire a disagreeable odor, low viscosity and low flash and fire points, the latter being due to dilutions with unburnt fuel or with light oils produced by the thermal decomposition of the original lubrificating oil. Such used lubricants often contain appreciable quantities of impurities of various types such as oxidation products of an acidic nature, asphaltic or tar-like products or particles of carbon. These impurities are found in the used oil in the colloidal state and therefore it is practically impossible to separate them completely from the still useful part of the lubricant by simple mechanical means such as filtration or centrifuging.

On the other hand, if however it were possible by such mechanical means to realize an appreciable purification, the resulting oil would still have intrinsic properties which would make it non-adaptable for good lubrification; in fact the molecular fragments derived from the thermal decomposition described above are of a non-saturated character and are therefore chemically unstable and would readily undergo further and more profound changes. Up till now, the processes for the purification of used lubricating oils cannot be considered process of true and complete regeneration, since the oils derived from various treatments have not completely reacquired their original characteristics. Among the simpler and more commonly used methods there can be considered those of a physical nature such as filtration or centrifuging, followed by distillation for the separation of lighter fractions. But by such means one can only obtain a partial separation of the substances contained in suspension, for the ultra microscopic particles which constitute the bulk of the impurities escape separation. The oil still retains its dark color and bad odor and its lubricating power is very low. Physical chemical processes are based on the treatment of the oil, eventually deprived of its light fractions by distillation, with natural or artificial porous materials which are used to absorb the impurities in suspension and the resinous and tarry-substances. In this case also only a partial purification is obtained while in many cases the used oil retains its acidity in excessive amounts. Among the systems of a physico-chemical nature the use of sodium silicate may be considered. This is used to extract the asphaltic and tarry particles giving two layers easily separable. Even after this treatment the lubricating oils do not fully reacquire their original characteristics.

The processes of a nature mainly chemical appear to be appreciably more efficient than the foregoing. The used lubricating oil is subjected to a treatment at convenient temperatures with definite chemical substances having a polymerizing and condensing action. The principal substance used for this purpose is sulphuric acid, but phosphoric acid, tin chloride and zinc chloride may also be used.

The treatment with these substances is used principally to transform the non-saturated compounds, i. e. the asphaltic and tarry bodies, into higher molecular weight compounds, in other words to join together and condense the non-saturated molecules, to form higher molecular weight, solid or semi-solid complexes which can be mechanically separated.

The useful action exerted in this sense by sulphuric acid is however counterbalanced by the inconvenience and the disadvantages that are presented by the use of this acid itself in the processing and refining of heavy mineral oils, viz. the impossibility of limiting its action to the objectionable substances which are to be separated, and the considerable loss which arises from the necessity of having to wash the oil with alkali and water. The oils frequently remain acid, and the lubricating power is generally much less than the original.

It has been observed by applicants that anhydrous aluminum chloride is used in the treatment of mineral oils either for converting high specific gravity and high boiling hydrocarbons into those with a lower density and boiling point or to purify high boiling point oils from non-saturated compounds which undergo changes more or less rapidly. While the first type of treatment is carried out at temperatures comprised in the range 100° to 600° C., the second is carried out at temperatures which generally do not exceed 100° C. and is more adapted to obtaining special oils, and oils for medicinal use which must be saturated, must have a pleasant odor and which must not easily oxidize or discolor on exposure to air. It has been further observed by applicants that while the high temperature treatment of hydrocarbons of high boiling point leads, by the formation of labile or unstable compounds between the aluminum chloride itself and the hydrocarbon, to a decomposition of the molecule of the latter with the formation of coke and lighter products, the treatment at lower temperatures is of an entirely different nature for the aluminum chloride exerts a predominatingly polymerizing and condensing action on the non-saturated compounds, condensing them under definite conditions into products which at ordinary temperatures are solid or semisolid.

It has furthermore been found by applicants that by the action exerted by aluminum chloride under specified conditions it is possible to completely purify a burnt lubricant from any type of impurity of an asphaltic or tarry origin and at the same time to reintegrate the original characteristics of the oil. The efficiency is much greater than that exerted by any other metallic chloride mentioned above. It is in fact possible, at reasonable temperature and with a convenient quantity of anhydrous aluminum chloride and with a determined time of treatment, to condense and conglomerate the colloidal impurities which exist in used lubricating oils, into a semi-solid mass which is precipitated and which can be easily separated by rough mechanical means: at the same time it is possible to make use of the strong polymerizing action of aluminum chloride to reconstruct the molecular edifice of the lubricant which has been decomposed and partially demolished as a consequence of the high temperatures and pressures reached during use. As the treatment with aluminum chloride may be preceded by a distillation in a current of steam, with a view to eliminating the light fractions present in the used oil and which acting as a diluent reduce the viscosity and flash and fire points, the lubricant finally reacquires all its original chemical and physical properties, except that of color. It is sufficient at this point to treat the oil with a decolorizing agent so that it recovers its original transparency and clearness.

The case may be given of used lubricating oils whose exact sources were known, and which after treatment had properties such that they could be judged without doubt, as superior to the new original oils. It is known in fact that many of the oils commonly found in commerce have not been subjected to refining to eliminate completely those products which above all are susceptible to alteration by cracking, oxidation, formation of gum and sludge etc. From this point of view a treatment with aluminum chloride which purifies the whole mass, carrying down the less resistant compounds, and at the same time contributing to strengthen the others, is eminently suitable for the purpose of purifying used lubricating oils.

The regeneration treatment of used lubricating oils by means of anhydrous aluminum chloride, which forms the object of the present disclosure, has the advantage over all the other systems of regeneration, of the great simplicity of the apparatus and the short time necessary for the purification. After the lubricant has been submitted to distillation in a current of steam in a boiler to separate the light fractions, the residual oil passes to a second boiler, where the polymerization takes place, and which is furnished with a stirrer and an inlet for the introduction of the aluminum chloride. The oil is heated to a maximum temperature of 135–140° C., after which it is completely and all at once discharged into a receiving vessel, where the separation of the asphaltic and carbon sludge takes place.

After such purifying treatment and subsequent decantation no washing treatment is necessary, it is only necessary to give the oil a treatment with decolorizing earth having de-acidifying properties, (decolorizing material of the type Frankonit S or Tonsil 13) which treatment takes place in a third boiler, provided with a stirrer and inlet, where the oil is freed from any traces of acidity it may contain arising from decomposition of the aluminum chloride. After this treatment the oil passes to the filter press after which it may be necessary to give it a second treatment with a decolorizing agent having more pronounced decolorizing properties, such as Frankonit HM or Tonsil A. C.

However the practical details of the described process are considered, it must be noted that in any case it is convenient to leave the raw used lubricating oil to settle in a receiving vessel, with the object of removing most of the water and particles of impurities. This tends to facilitate the distillation and results in economizing catalyst necessary for the purification.

It is also convenient to make a preliminary trial on a small scale on the used carbonized lubricating oil to find out the precise quantity of catalyst necessary for a given type of oil to ensure at the same time complete purification and efficient polymerizing and condensing action.

After the oil has been distilled in a current of steam and after the light fractions have been removed, the oil is left until its temperature falls to about 80° C., when it is introduced into the boiler where it is treated with the purifying agent aluminum chloride. At such a temperature the aluminum chloride is added gradually with constant stirring.

The temperature rises gradually while little by little all the catalyst is added: the quantity corresponding to the preliminary small scale trial, but in no case is it less than 2.2% of the residual lubricating oil resulting from the distillation treatment nor greater than 2.6%. After the addition of all the catalyst the temperature is raised as quickly as possible to 135–138° C., at which point it is maintained constant for half an hour, with continuous vigorous stirring. After this the oil is rapidly discharged from the boiler so that the sludge does not settle in it, but in the appropriate receiver for its deposition.

Applicants find that the temperature range of 130° C., to 140° C., is critical because a minimum temperature of 130° C., is strictly necessary for the complete precipitation of all the impurities of an asphaltous or tarry nature and for the coagulation of the sludge to such a consistency that it can be easily separated as a solid or semisolid and it is also strictly necessary to limit the heating of the charge of oil so as not to allow the temperature to rise above 140° C., or cracking reactions may take place, with the resulting formation of light products which would lower the flash point.

The aforesaid treatment with anhydrous aluminum chloride is prolonged after complete precipitation of the impurities of an asphaltous, tarry or like nature has taken place, in order to permit reconstruction of the molecular structure of the oil which has been attacked and partially destroyed during use.

It is also necessary to stir in such a way as to agitate violently the liquid to obtain intimate contact between the catalyst and the oil, and to avoid superheating at the bottom and sides of the boiler.

The subsequent treatment with decolorizing earth having neutralizing properties must be effected at temperatures not below 150° C., when the complete development of hydrochloric acid formed by the decomposition of aluminum chloride and water contained in the decolorizer itself will take place and be aided by violent agitation.

For this reason, the walls of the boiler above the liquid level must be coated with acid resisting material. The final treatment with a highly efficient decolorizer must also take place at a temperature not less than 150° C.

The quantity of neutralizing earth should be not less than 2% and generally not more than 3% of the lubricating oil to be treated while the decolorizing earth need not exceed 4-5%.

After the oil has passed through the filter press it will have reacquired in full, all its original characteristics among which are flash and fire points, viscosity, odor and color. The inorganic and organic acidity, even if in large amounts in the burnt oil, will be reduced to negligible quantities. In comparison with the original lubricant before use the asphaltic pitch residue (sulphuric acid test) will be much less, and hence lower values are obtained in the Conradson test. The regenerated oil will have a lubricating power equal to or superior to the original, which is demonstrated by frequently obtaining considerably higher values in the Stephens consistometer test when comparing regenerated oil with the same oil before use.

The yield of the process is about 70% naturally depending on the amount of wear and tear to which the oil has been subjected.

Having described our invention we claim:—

1. The step in the process of purification and regeneration of used lubricating oils comprising in the intimate mixing of such oils with anhydrous aluminum chloride at a temperature in the range between 130° C., and 140° C., to cause through polymerization complete precipitation of the impurities of a tarry, asphaltic or like nature contained in such used lubricating oil and to coagulate such tarry, asphaltic and like impurities into a sludge readily separable as a solid or semi-solid.

2. The steps in the process of purification and regeneration of used lubricating oils comprising in intimately mixing in a container a charge of used lubricating oil with a predetermined quantity of powdered anhydrous aluminum chloride, heating said charge to a temperature in the range between 130° C., and 140° C., maintaining said temperature for at least half an hour to cause through polymerization complete precipitation of the impurities of a tarry, asphaltic and like nature contained in such used lubricating oil and thereafter prolonging the treatment within the same temperature range to procure an additional and more complete reaction between said charge and said quantity of anhydrous aluminum chloride and to produce a reconstruction of the molecular structure of hydrocarbons which have been partially destroyed, reconstruct the molecular structure of the oil which has been attacked and partially destroyed during use.

3. The steps in the process of purification and regeneration of used lubricating oils comprising in intimately mixing in a container a charge of used lubricating oil with a predetermined quantity of powered anhydrous aluminum chloride at a suitable low temperature, raising the temperature of said charge to the range between 130° C., and 140° C., maintaining said temperature for approximately half an hour to cause through polymerization complete precipitation of the impurities of a tarry, asphaltic and like nature contained in such used lubricating oil and to coagulate such tarry, asphaltic and like impurities into a sludge readily separable as a solid or semi-solid.

4. The steps in the process of purification and regeneration of used lubricating oils comprising in the stirring with a charge of used lubricating oil of a quantity of powdered anhydrous aluminum chloride comprising from 2.2% to 2.6% of said charge and heating said charge to a temperature in the range between 130° C., and 140° C., for approximately half an hour to cause through polymerization complete precipitation of the impurities into a sludge readily separable as a solid or semi-solid.

5. The steps in the process of purification and regeneration of used lubricating oils comprising in the intimate mixing of such oils with anhydrous aluminum chloride at a temperature in the range between 130° C., and 140° C., for a time period of half an hour to cause by polymerization complete precipitation of the impurities of a tarry, asphaltic or like nature contained in such used lubricating oil and to coagulate such tarry, asphaltic and like impurities into a sludge readily separable as a solid or semi-solid.

6. The steps in the process of purification and regeneration of used lubricating oils comprising in intimately mixing in a container a charge of used lubricating oil with a predetermined quantity of powdered anhydrous aluminum chloride at a suitable low temperature, raising the temperature of said charge to the range between 130° C., and 140° C., maintaining said temperature for at least half an hour to cause through polymerization complete precipitation of the impurities of a tarry, asphaltic and like nature contained in such used lubricating oil, thereafter prolonging the treatment within the same temperature range to procure an additional and more complete reaction between said charge and said quantity of anhydrous aluminum chloride and to produce a reconstruction of the molecular structure of hydrocarbons which have been partially destroyed and then rapidly discharging said charge from the container, and separating said solid or semi-solid sludge in another container.

7. The steps in the process of purification and regeneration of used lubricating oils comprising in the intimate mixing of such oils with anhydrous aluminum chloride at a temperature in the range between 130° C., and 140° C., for at least half an hour to cause through polymerization complete precipitation of the impurities of a tarry, asphaltic or like nature contained in such used lubricating oil and to coagulate such tarry, asphaltic and like impurities into a sludge readily separable as a solid or semi-solid, thereafter prolonging the treatment within the same temperature range to procure an additional and more complete reaction between said charge and said quantity of anhydrous aluminum chloride and to produce a reconstruction of the molecular structure of hydrocarbons which have been partially destroyed, and treating said oil with a decolorizing agent.

8. The steps in the process of purification and regeneration of used lubricating oils comprising in intimately mixing in a container a charge of used lubricating oil with a quantity of powdered anhydrous aluminum chloride comprising from 2.2% to 2.6% of the charge, heating said charge to the range between 130° C., and 140° C., maintaining said temperature for at least half an hour to cause through polymerization complete precipitation of the impurities of a tarry, asphaltic and like nature contained in such used lubricating oil, thereafter prolonging the treatment within the same temperature range to procure an additional and more complete reaction between said charge and said quantity of anhydrous aluminum chloride and to produce a reconstruction of the molecular structure of hydrocarbons which have been partially destroyed, and treating said oil charge with a decolorizing agent.

9. The steps in the process of purification and regeneration of used lubricating oils comprising in the intimate mixing of such oils with anhydrous aluminum chloride at a temperature in the range between 130° C., and 140° C., for approximately half an hour to cause through polymerization complete precipitation of the impurities of a tarry, asphaltic or like nature contained in such used lubricating oil and to coagulate such tarry, asphaltic and like impurities into a sludge readily separable as a solid or semi-solid, then separating the precipitated and coagulated matter from the oil and treating said oil with a decolorizing agent having de-acidifying properties.

10. The process of purification and regeneration of used lubricating oils comprising in intimately mixing in a container a charge composed of used lubricating oil and a quantity of powdered anhydrous aluminum chloride comprising from 2.2% to 2.6% of the charge, heating said charge to a temperature in the range between 130° C., and 140° C., maintaining said temperature for a time period of half an hour to cause, by polymerization, complete precipitation of the impurities of a tarry, asphaltic and like nature contained in such used lubricating oil and to coagulate such tarry, asphaltic and like impurities into a sludge readily separable as a solid or semi-solid, separating said sludge from the oil, and treating the separated oil with a decolorizing and de-acidifying agent at a temperature of about 150° C.

MARIO GIACOMO LEVI.
ALBERTO MARIOTTI.
IGINO CIARROCCHI.